(12) United States Patent
Takazawa et al.

(10) Patent No.: US 12,505,541 B2
(45) Date of Patent: Dec. 23, 2025

(54) MEDICAL INFORMATION PROCESSING APPARATUS AND MEDICAL INFORMATION PROCESSING METHOD

(71) Applicant: CANON MEDICAL SYSTEMS CORPORATION, Otawara (JP)

(72) Inventors: Junichi Takazawa, Nasushiobara (JP); Taisuke Iwamura, Utsunomiya (JP); Yuki Matsumoto, Utsunomiya (JP); Satoshi Sugisawa, Utsunomiya (JP)

(73) Assignee: CANON MEDICAL SYSTEMS CORPORATION, Otawara (JP)

( * ) Notice: Subject to any disclaimer, the term of this patent is extended or adjusted under 35 U.S.C. 154(b) by 445 days.

(21) Appl. No.: 18/189,345

(22) Filed: Mar. 24, 2023

(65) Prior Publication Data

US 2023/0316512 A1    Oct. 5, 2023

(30) Foreign Application Priority Data

Mar. 30, 2022    (JP) .................... 2022-056326

(51) Int. Cl.
*G06T 7/00*    (2017.01)
*G16H 30/40*    (2018.01)

(52) U.S. Cl.
CPC ........... *G06T 7/0012* (2013.01); *G16H 30/40* (2018.01); *G06T 2207/10116* (2013.01)

(58) Field of Classification Search
CPC ........... A61B 6/50; A61B 6/54; A61B 6/5294; A61B 8/08; G06T 7/0012; G06T 2207/20081; G06T 2207/30004; G06T 2210/41; G06T 2207/10116; G16H 30/40; G16H 50/20; G16H 50/30; G16H 50/70; G16H 10/60; G16H 30/00; G16H 70/60

See application file for complete search history.

(56) References Cited

U.S. PATENT DOCUMENTS

| | | | |
|---|---|---|---|
| 9,111,027 B2 * | 8/2015 | Kozuka ................. | G06Q 10/10 |
| 2004/0122787 A1 * | 6/2004 | Avinash ................. | A61B 5/395 |
| | | | 706/50 |
| 2005/0209888 A1 | 9/2005 | Oowaki et al. | |
| 2008/0058611 A1 * | 3/2008 | Tsubura ................. | G16H 70/00 |
| | | | 600/300 |

FOREIGN PATENT DOCUMENTS

| | | |
|---|---|---|
| JP | 2006-150033 A | 6/2006 |
| JP | 2012-120758 A | 6/2012 |

* cited by examiner

*Primary Examiner* — Courtney Joan Nelson
(74) *Attorney, Agent, or Firm* — Oblon, McClelland, Maier & Neustadt, L.L.P.

(57) ABSTRACT

A medical information processing apparatus according to an embodiment includes processing circuitry. The processing circuitry is configured to acquire examination records of X-ray examinations performed on a plurality of patients; based on the acquired examination record, count the number of examinations for each content of X-ray examination used for each of the patients before a diagnosis is made, for a certain disease; and output whether there is a significant difference between the number of examinations for each content of X-ray examination serving as a reference, and the number of examinations for each content of X-ray examination counted by a first counting unit.

7 Claims, 3 Drawing Sheets

| CONTENT OF X-RAY EXAMINATION | SIGNIFICANT DIFFERENCE |
|---|---|
| CONTENT A OF X-RAY EXAMINATION | YES |
| CONTENT B OF X-RAY EXAMINATION | YES |
| CONTENT C OF X-RAY EXAMINATION | NO |

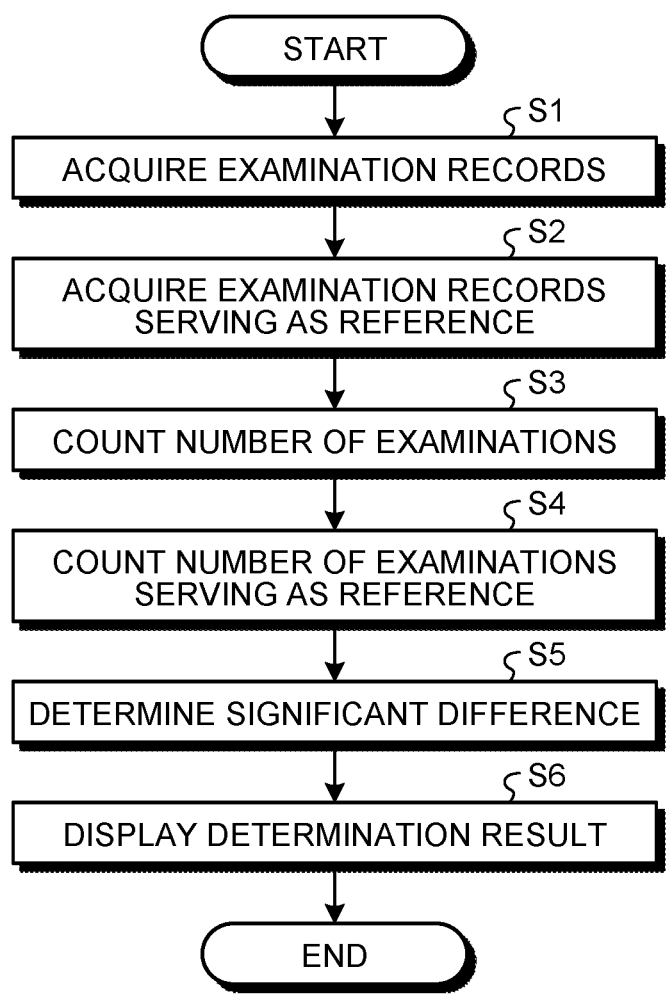

MEDICAL INFORMATION PROCESSING APPARATUS AND MEDICAL INFORMATION PROCESSING METHOD

CROSS-REFERENCE TO RELATED APPLICATIONS

This application is based upon and claims the benefit of priority from Japanese Patent Application No. 2022-056326, filed on Mar. 30, 2022; the entire contents of which are incorporated herein by reference.

FIELD

Embodiments described herein relate generally to a medical information processing apparatus and a medical information processing method.

BACKGROUND

Conventionally, diagnostic reference levels (DRLs) and the like are defined as guidelines for upper limit of medical exposure. On the other hand, in the X-ray examinations, there are no guidelines for lower limit of medical exposure. If the X-ray dose is too low, the image is blurred, and the patient needs to undergo another X-ray examination. In this case, the medical exposure dose of the patient increases.

However, guidelines for lower limit of medical exposure are not specifically regulated. Thus, in the X-ray examination, it has been difficult to determine whether the X-ray dose is too low.

BRIEF DESCRIPTION OF THE DRAWINGS

FIG. 4 is a flowchart illustrating an example of a determination process executed by a medical information processing apparatus according to the first embodiment.

DETAILED DESCRIPTION

Figure 1:
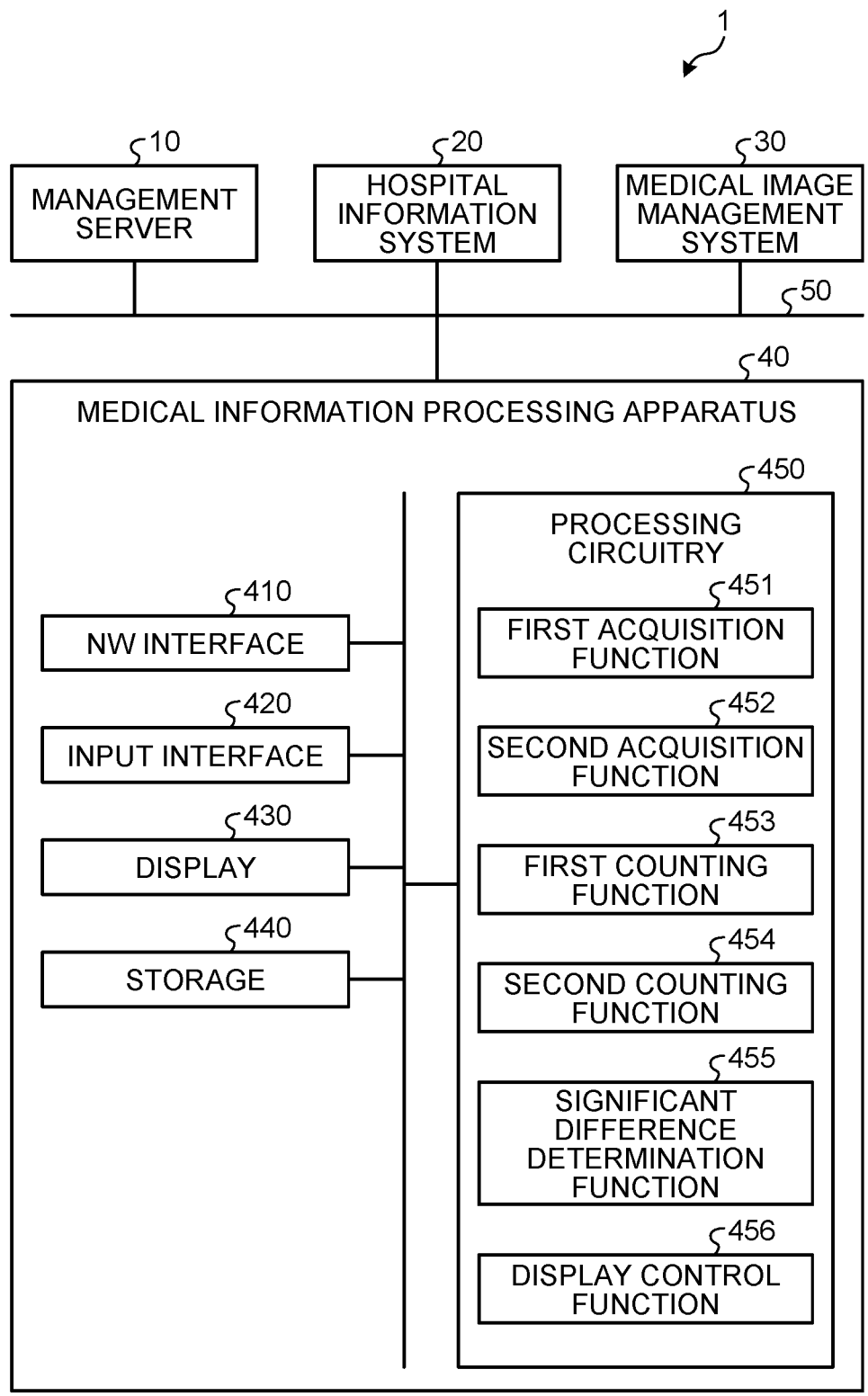
FIG. 1 is a block diagram illustrating an example of a configuration of an X-ray dose management system according to a first embodiment.

Hereinafter, a medical information processing apparatus and a medical information processing method according to the present embodiment will be described in detail with reference to the accompanying drawings. In the following embodiments, the parts with the same reference numerals perform the same operation, and duplicate description will be omitted as appropriate.

First Embodiment

FIG. 1 is a block diagram illustrating an example of a configuration of an X-ray dose management system 1 according to a first embodiment. The X-ray dose management system 1 includes a management server 10, a hospital information system (HIS) 20, a medical image management system (picture archiving and communication systems (PACS)) 30, and a medical information processing apparatus 40. Moreover, the systems and apparatuses included in the X-ray dose management system 1 are communicably connected to each other via a network 50. The configuration illustrated in FIG. 1 is merely an example, and the number of systems and devices may be optionally changed. Furthermore, devices not illustrated in FIG. 1 may also be connected to the network 50.

The X-ray dose management system 1 manages the medical exposure dose to which the patient is subjected. More specifically, the X-ray dose management system 1 compares between the number of X-ray examinations performed on the patient in other medical institutions before a definitive diagnosis is made, and the number of X-ray examinations performed on the patient in the medical institution to which the health care professional belongs before a definitive diagnosis is made. The X-ray dose management system 1 then determines whether there is a significant difference in the number of examinations.

In this example, a relation between the number of examinations and the medical exposure dose will be described, using an example in which a definitive diagnosis of "subarachnoid hemorrhage" is made for a certain patient. Cerebral hemorrhage was confirmed by X-ray computed tomography (CT) examination. However, because the X-ray image is unclear, a health care professional cannot make a definitive diagnosis. After the re-examination with an increased X-ray dose, the health care professional makes a definitive diagnosis of "subarachnoid hemorrhage". In such a case, if the X-ray CT examination is performed at the X-ray dose used in the re-examination from the beginning, the health care professional can make a definitive diagnosis of "subarachnoid hemorrhage" by a single X-ray CT examination. With an increase in the number of X-ray examinations, the medical exposure dose of the patient increases.

Therefore, the X-ray dose management system 1 compares between the number of X-ray examinations carried out in other medical institutions and the number of X-ray examinations carried out in the medical institution to which the health care professional belongs, and determines whether there is a significant difference. Then, the X-ray dose management system 1 outputs whether there is a significant difference between the numbers of X-ray examinations. In this manner, the health care professional may take the opportunity to consider whether the X-ray dose is too low.

The X-ray dose management system 1 will be described in detail.

For example, the management server 10, the hospital information system 20, and the medical image management system 30 are implemented by computer apparatuses such as a server and a workstation.

The management server 10 manages the examination records of X-ray examinations carried out in external institutions. For example, the management server 10 stores examination record information including the examination records of X-ray examinations performed on a plurality of patients. For example, the examination record information is examination records of X-ray examinations obtained from a plurality of medical institutions. The X-ray examination is an examination in which a patient is diagnosed by irradiating the patient with X-rays, using an X-ray diagnostic device, an X-ray computed tomography (CT) device, and the like.

The examination record information includes information such as definitive diagnosis, contents of X-ray examination, medical exposure dose, examination date and time, and patient identification information, for each X-ray examination. The definitive diagnosis is the diagnostic result of disease, injury, and the like confirmed by X-ray examination. The contents of X-ray examination include the modality used in the examination such as an X-ray diagnostic device and an X-ray CT device, the purpose of examination, the examination method, and the diagnostic region, and is information indicating what kind of examination was performed. For example, the contents of X-ray examination are diagnostic protocols, and can be obtained from Digital Imaging and Communications in Medicine (DICOM) tags, examination orders, and the like. The medical exposure dose is the X-ray dose to which the patient is subjected during each X-ray examination. The examination date and time is the date and time of the X-ray examination. The patient identification information is identification information for identifying the patient. Then, the examination record information will be used as reference information.

The hospital information system 20 stores electronic medical record information that is the medical record of the patient. The electronic medical record information includes patient identification information for identifying the patient, examination identification information for identifying the X-ray examination, and definitive diagnosis confirmed by X-ray examination. Moreover, the electronic medical record information may also include contents of X-ray examination.

The medical image management system 30 stores medical image information. The medical image information includes a medical image and image information in DICOM format. The image information includes contents of X-ray examination, medical exposure dose, and examination date and time.

The medical information processing apparatus 40 is implemented by a computer apparatus such as a personal computer. The medical information processing apparatus 40 compares between the examination record of the X-ray examination that is obtained from the management server 10 and that is serving as a reference, and the examination record of the X-ray examination to be verified that is obtained from the hospital information system 20 and the medical image management system 30, for a certain disease, and determines whether there is a significant difference in the number of examinations for each content of X-ray examination. Moreover, the medical information processing apparatus 40 displays the determination result of whether there is a significant difference in the number of examinations for each content of X-ray examination. Then, the health care professional considers whether the X-ray dose is too low, according to the determination result of whether there is a significant difference in the number of examinations.

The medical information processing apparatus 40 will be described in detail.

The medical information processing apparatus 40 includes a network (NW) interface 410, an input interface 420, a display 430, a storage 440, and processing circuitry 450.

The NW interface 410 is connected to the processing circuitry 450, and controls the transmission and communication of various types of data performed between the devices connected via the network 50. For example, the NW interface 410 is implemented by a network card, a network adapter, a network interface controller (NIC), and the like.

The input interface 420 is connected to the processing circuitry 450, converts an input operation received from the operator (health care professional) into an electrical signal, and outputs the electrical signal to the processing circuitry 450. Specifically, the input interface 420 converts an input operation received from the operator into an electrical signal, and outputs the electrical signal to the processing circuitry 450. For example, the input interface 420 is implemented by a trackball, a switch button, a mouse, a keyboard, a touch pad with which input operations are performed by touching an operation surface, a touch screen in which a display screen and a touch pad are integrated, a non-contact input circuit using an optical sensor, a voice input circuit, and the like. In the present specification, the input interface 420 is not limited to one having physical operation parts such as a mouse and a keyboard. For example, an electrical signal processing circuit that receives an electrical signal corresponding to an input operation from an external input device, which is provided separately from the device, and that outputs the electrical signal to a control circuit, is also an example of the input interface 420.

The display 430 is connected to the processing circuitry 450 and displays various types of information and image data output from the processing circuitry 450. For example, the display 430 is implemented by a liquid crystal display, a cathode ray tube (CRT) display, an organic EL display, a plasma display, a touch panel, and the like.

The storage 440 is connected to the processing circuitry 450, and stores various types of data. Moreover, the storage 440 stores various computer programs for implementing various functions that are read and executed by the processing circuitry 450. For example, the storage 440 is implemented by a semiconductor memory device such as a random access memory (RAM) and flash memory, a hard disk, an optical disc, and the like.

The processing circuitry 450 controls the entire operation of the medical information processing apparatus 40. For example, the processing circuitry 450 includes a first acquisition function 451, a second acquisition function 452, a first counting function 453, a second counting function 454, a significant difference determination function 455, and a display control function 456. In the embodiment, each processing function performed by the first acquisition function 451, the second acquisition function 452, the first counting function 453, the second counting function 454, the significant difference determination function 455, and the display control function 456 serving as components, is stored in the storage 440 in the form of a computer executable program. The processing circuitry 450 is a processor that reads and executes a computer program from the storage 440, and implements the function corresponding to each computer program. In other words, the processing circuitry 450 that has read out computer programs has the functions illustrated in the processing circuitry 450 in FIG. 1.

In FIG. 1, the first acquisition function 451, the second acquisition function 452, the first counting function 453, the second counting function 454, the significant difference determination function 455, and the display control function 456 are implemented by a single processor. However, the processing circuitry 450 can also be configured by combining a plurality of independent processors, and each processor can execute a computer program to implement the function. Moreover, in FIG. 1, a single storage circuit such as the storage 440 stores a computer program corresponding to each processing function. However, a plurality of storage circuits may be distributed and arranged, and the processing circuitry 450 may read the corresponding computer program from the storage circuit independently.

For example, the term "processor" used in the above description refers to a central processing unit (CPU), a graphical processing unit (GPU), or a circuit such as an application specific integrated circuit (ASIC) and a programmable logic device (for example, a simple programmable logic device (SPLD), a complex programmable logic device (CPLD), and a field programmable gate array (FPGA)). The processor implements functions by reading and executing a computer program stored in the storage 440. Instead of storing a computer program in the storage 440, a computer program may also be directly embedded in a circuit of the processor. In this case, the processor implements the function by reading and executing a computer program embedded in the circuit.

The first acquisition function 451 acquires the examination records of X-ray examinations performed on the patients, in the medical institution to which the health care professional belongs. The first acquisition function 451 is an example of a first acquisition unit. More specifically, the first acquisition function 451 acquires electronic medical record information from the hospital information system 20. Moreover, the first acquisition function 451 acquires medical image information including the patient identification information and examination identification information in the acquired electronic medical record information, from the medical image management system 30. That is, the first acquisition function 451 acquires information such as definitive diagnosis, contents of X-ray examination, X-ray dose, examination date and time, and patient identification information, as information to be verified.

Moreover, the first acquisition function 451 may receive conditions for acquiring an examination record. For example, upon receiving the designation of a definitive diagnosis that is a confirmed diagnosis, the first acquisition function 451 may acquire the examination record of the designated definitive diagnosis. The first acquisition function 451 acquires electronic medical record information including the designated definitive diagnosis from the hospital information system 20. Specifically, when "subarachnoid hemorrhage" is designated as a definitive diagnosis, the first acquisition function 451 acquires the electronic medical record information of the patient with a definitive diagnosis of "subarachnoid hemorrhage" from the hospital information system 20. Then, the first acquisition function 451 acquires medical image information including the patient identification information and examination identification information in the acquired electronic medical record information, from the medical image management system 30.

The second acquisition function 452 acquires the examination records of X-ray examinations performed on the patients in the other medical institutions, that is, the examination record serving as a reference. The second acquisition function 452 is an example of a second acquisition unit. More specifically, the second acquisition function 452 acquires examination record information from the management server 10. That is, the second acquisition function 452 acquires information such as definitive diagnosis, contents of X-ray examination, X-ray dose, examination date and time, and patient identification information, as reference information.

Moreover, similar to the first acquisition function 451, the second acquisition function 452 may receive conditions for acquiring an examination record. For example, upon receiving the designation of a definitive diagnosis that is a confirmed diagnosis, the second acquisition function 452 may acquire the examination record of the designated definitive diagnosis. More specifically, the second acquisition function 452 may acquire the examination record of the designated definitive diagnosis, among the examination records in the examination record information.

On the basis of the examination record acquired by the first acquisition function 451, the first counting function 453 counts the number of examinations for each content of X-ray examination used for each of the patients before a diagnosis is made, for a certain disease. The first counting function 453 is an example of a first counting unit. For example, the first counting function 453 counts the number of X-ray examinations received by a certain patient, before the patient is diagnosed with "subarachnoid hemorrhage", for each content of X-ray examination.

Moreover, for example, the certain disease is the disease with a definitive diagnosis designated by the first acquisition function 451. When the examination record of the definitive diagnosis designated by the first acquisition function 451 is acquired, the first counting function 453 counts the number of examinations for each content of X-ray examination received by the patient with definitive diagnosis.

Moreover, the first counting function 453 may receive the counting conditions for counting the number of examinations. In the X-ray examination in this example, guidelines for upper limit of X-ray to be emitted to the patient are regulated by diagnostic reference levels and the like. It can be assumed that there is hardly a case when the X-ray dose is too low, when the X-ray is higher than the guidelines for upper limit of X-ray. Therefore, for example, the first counting function 453 receives the designation of the upper limit of medical exposure dose. On the basis of the examination records acquired by the first acquisition function 451, the first counting function 453 counts the number of examinations in which the medical exposure dose is equal to or less than the designated upper limit, for each content of X-ray examination used for each of the patients.

On the basis of the examination records acquired by the second acquisition function 452, the second counting function 454 counts the number of examinations for each content of X-ray examination used for each of the patients from the first medical examination to the definitive diagnosis, for a certain disease. The second counting function 454 is an example of a second counting unit. For example, the second counting function 454 counts the number of X-ray examinations received by a certain patient, before the patient is diagnosed with "subarachnoid hemorrhage".

Moreover, for example, a certain disease is the disease with a definitive diagnosis designated by the second acquisition function 452. When the examination record of the definitive diagnosis designated by the second acquisition function 452 is acquired, the second counting function 454 counts the number of examinations for each content of X-ray examination received by the patient with definitive diagnosis.

Furthermore, similar to the first counting function 453, the second counting function 454 may receive the counting conditions for counting the number of examinations. For example, the second counting function 454 receives the designation of the upper limit of medical exposure dose. On the basis of the examination records acquired by the second acquisition function 452, the second counting function 454 counts the number of examinations in which the medical exposure dose is equal to or less than the designated upper limit, for each content of X-ray examination used for each of the patients.

The significant difference determination function 455 determines whether there is a significant difference between the number of examinations for each content of X-ray examination serving as a reference, and the number of examinations for each content of X-ray examination counted by the second counting function 454. Moreover, when the number of examinations for each content of X-ray examination serving as a reference and the number of examinations for each content of X-ray examination counted by the second counting function 454 are compared, the significant difference determination function 455 may determine whether there is a significant difference and whether the number of X-ray examinations counted by the second counting function 454 is greater.

More specifically, the significant difference determination function 455 uses statistical methods to determine whether there is a significant difference between the number of examinations for each content of X-ray examination serving as a reference, and the number of examinations for each content of X-ray examination counted by the second counting function 454.

For example, the significant difference determination function 455 uses a t-test to determine whether there is a significant difference. The t-test is used to determine whether there is a significant difference, by determining whether the significance level set for the t-distribution is satisfied. Moreover, the significant difference determination function 455 may also determine whether there is a significant difference between the numbers of examinations for each content of X-ray examination using another method in addition to the t-test.

The display control function 456 outputs whether there is a significant difference between the number of examinations for each content of X-ray examination serving as a reference, and the number of examinations for each content of X-ray examination counted by the first counting function 453. The significant difference determination function 455 and the display control function 456 are each an example of an output unit. Moreover, when the first acquisition function 451 receives the designation of a definitive diagnosis, the display control function 456 outputs whether there is a significant difference between the number of examinations for each content of X-ray examination received by the patient with definitive diagnosis serving as a reference, and the number of examinations for each content of X-ray examination counted by the first counting function 453.

Figures 2, 3:
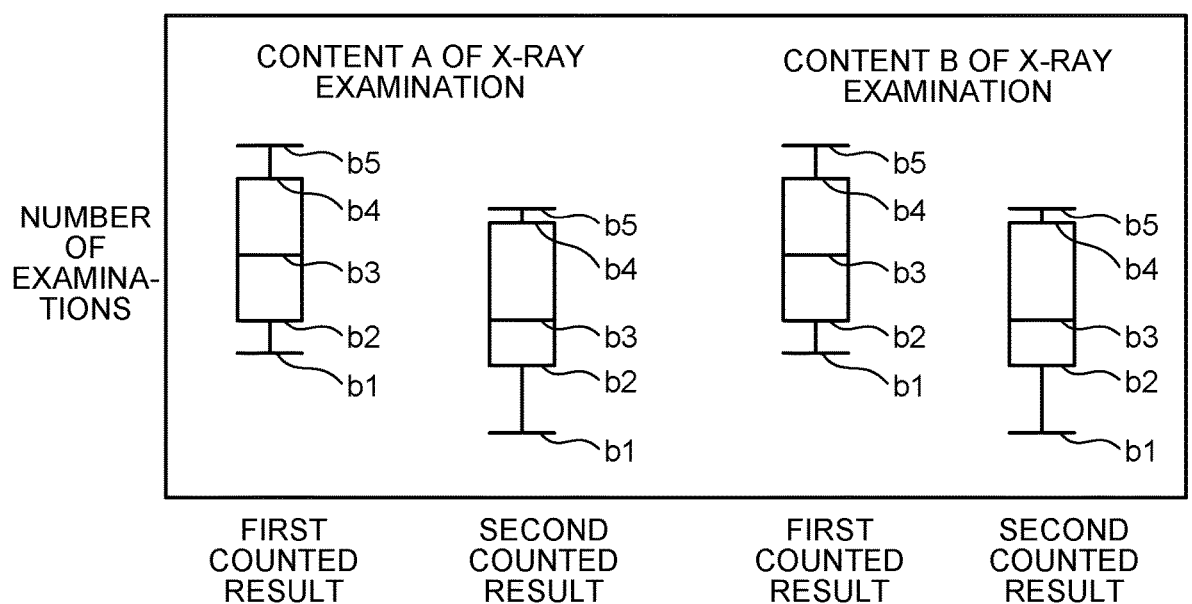
FIG. 2 is a diagram illustrating an example of an image of a list of determination results.
FIG. 3 is a diagram illustrating an example of a box-and-whisker plot illustrating the distribution of the number of examinations for each content of X-ray examination.

More specifically, the display control function 456 displays whether there is a significant difference between the numbers of examinations for each content of X-ray examination, on the display 430. For example, the display control function 456 displays an image of a list of determination results indicating the determination results determined by the significant difference determination function 455. FIG. 2 is a diagram illustrating an example of an image of a list of determination results. The image of a list of determination results is a list indicating whether there is a significant difference between the numbers of examinations for each content of X-ray examination determined by the significant difference determination function 455. That is, the display control function 456 displays an image of a list of determination results indicating whether there is a significant difference between the number of examinations for each content of X-ray examination serving as a reference, and the number of examinations for each content of X-ray examination counted by the second counting function 454.

Moreover, the display control function 456 may display the distribution of the number of examinations for each content of X-ray examination counted by the second counting function 454 serving as a reference, and the distribution of the number of examinations for each content of X-ray examination counted by the first counting function 453 in a comparable manner. For example, the display control function 456 displays a box-and-whisker plot illustrating the distribution of the number of examinations for each content of X-ray examination serving as a reference, and a box-and-whisker plot illustrating the distribution of the number of examinations for each content of X-ray examination counted by the first counting function 453 side by side. FIG. 3 is a diagram illustrating an example of a box-and-whisker plot illustrating the distribution of the number of examinations for each content of X-ray examination. As illustrated in FIG. 3, the display control function 456 displays the box-and-whisker plot illustrating the counted results of the first counting function 453, and the box-and-whisker plot illustrating the counted results of the second counting function 454 side by side.

In the box-and-whisker plot, the distribution of the number of examinations is divided into four equal parts. The box-and-whisker plot includes a first line b1, a second line b2, a third line b3, a fourth line b4, and a fifth line b5. The first line b1 is a line indicating the minimum value of the number of examinations. The second line b2 is a line indicating the first quartile of the number of examinations. The second line b2 is the line indicating the median of the values smaller than the median of the number of examinations. The third line b3 is a line indicating the median of the number of examinations. The fourth line b4 is a line indicating the third quartile of the number of examinations. The fourth line b4 is the line indicating the median of values greater than the median of the number of examinations. The fifth line b5 is a line indicating the maximum value of the number of examinations.

By displaying the box-and-whisker plot, the display control function 456 can allow the user to identify the distribution of the number of examinations. Moreover, by displaying the box-and-whisker plots side by side, the display control function 456 can allow the user to compare the distributions of the number of examinations. Furthermore, the display control function 456 may display the distribution of the number of examinations in other forms, in addition to the box-and-whisker plots. Still furthermore, when the number of examinations for each content of X-ray examination serving as a reference and the number of examinations for each content of X-ray examination counted by the second counting function 454 are compared, the display control function 456 may display whether there is a significant difference and whether the number of X-ray examinations counted by the second counting function 454 is greater.

Next, a determination process executed by the medical information processing apparatus 40 will be described.

FIG. 4 is a flowchart illustrating an example of a determination process executed by the medical information processing apparatus 40 according to the first embodiment.

The first acquisition function 451 acquires the examination records of X-ray examinations performed on the patients (step S1).

The second acquisition function 452 acquires the examination records of X-ray examinations performed on the patients, as reference information (step S2).

On the basis of the examination records acquired by the first acquisition function 451, the first counting function 453 counts the number of X-ray examinations used for each of the patients from the first medical examination to the definitive diagnosis, for a certain disease, for each of the patients (step S3).

On the basis of the examination records acquired by the second acquisition function 452, the second counting function 454 counts the number of X-ray examinations performed from the first medical examination to the definitive diagnosis serving as a reference, for each of the patients (step S4).

The significant difference determination function 455 determines whether there is a significant difference between the number of examinations serving as a reference, and the number of examinations for each content of X-ray examination counted by the first counting function 453 (step S5).

The display control function 456 displays the determination results by the significant difference determination function 455 for each content of X-ray examination (step S6).

Accordingly, the medical information processing apparatus 40 finishes the determination process.

As described above, the medical information processing apparatus 40 according to the first embodiment acquires the examination records of X-ray examinations performed on the patients, in the medical institution to which the health care professional belongs. On the basis of the acquired examination records, the medical information processing apparatus 40 counts the number of examinations for each content of X-ray examination used for each of the patients before a definitive diagnosis is made, for a certain disease. Then, the medical information processing apparatus 40 outputs whether there is a significant difference between the number of examinations for each content of X-ray examination serving as a reference, and the counted number of examinations for each content of X-ray examination. In this manner, the health care professional may take the opportunity to reconsider the X-ray dose in X-ray examination, if there is a significant difference between the number of X-ray examinations carried out in the medical institution to which the health care professional belongs, and the number of X-ray examinations carried out in the other medical institutions. Hence, the medical information processing apparatus 40 can support the health care professional in determining whether the X-ray dose is too low.

First Modification

The medical information processing apparatus 40 according to the first embodiment includes the second counting function 454. However, if the management server 10 stores the counted examination records, the second acquisition function 452 acquires the number of examinations for each content of X-ray examination. In this case, the medical information processing apparatus 40 may not include the second counting function 454. Then, the display control function 456 may display the distribution of the counted number of examinations for each content of X-ray examination serving as a reference, and the distribution of the number of examinations for each content of X-ray examination counted by the first counting function 453 in a comparable manner.

Second Modification

The medical information processing apparatus 40 according to the first embodiment is a computer apparatus such as a personal computer. However, the medical information processing apparatus 40 may also be a computer apparatus such as a server or a workstation. That is, the medical information processing apparatus 40 may operate according to a request from a device not illustrated in the X-ray dose management system 1 illustrated in FIG. 1, and display various images on the requested device.

The medical information processing apparatus 40 according to the first embodiment includes the first acquisition function 451, the second acquisition function 452, the first counting function 453, the second counting function 454, the significant difference determination function 455, and the display control function 456. However, other device may include some of the first acquisition function 451, the second acquisition function 452, the first counting function 453, the second counting function 454, the significant difference determination function 455, and the display control function 456. Then, the medical information processing apparatus 40 may communicate with the other device, and execute various processes in cooperation with the other devices.

Third Modification

The medical information processing apparatus 40 according to the first embodiment implements the first acquisition function 451, the second acquisition function 452, the first counting function 453, the second counting function 454, the significant difference determination function 455, and the display control function 456, by executing a computer program stored in the storage 440. However, the medical information processing apparatus 40 may implement all or part of the first acquisition function 451, the second acquisition function 452, the first counting function 453, the second counting function 454, the significant difference determination function 455, and the display control function 456, using hardware such as a semiconductor circuit.

According to at least one of the embodiments described above and the like, it is possible to support the health care professional in determining whether the X-ray dose is too low.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A medical information processing apparatus, comprising:
   processing circuitry configured to
      acquire an examination record of an X-ray examination performed on a plurality of patients;
      based on the acquired examination record, count number of examinations for each content of X-ray examination used for each of the patients before a diagnosis is made, for a certain disease; and
      output whether there is a significant difference between number of examinations for each content of X-ray examination serving as a reference, and number of examinations for each content of X-ray examination counted.

2. The medical information processing apparatus according to claim 1, wherein the processing circuitry
   acquires, upon receiving a designation of a definitive diagnosis that is a confirmed diagnosis, the examination record of a patient with the definitive diagnosis,
   counts number of examinations for each content of X-ray examination received by the patient with definitive diagnosis, and
   outputs whether there is a significant difference between number of examinations for each content of X-ray examination received by the patient with definitive diagnosis serving as a reference, and number of examinations for each content of X-ray examination counted.

3. The medical information processing apparatus according to claim 1, wherein the processing circuitry displays distribution of the number of examinations for each content of X-ray examination serving as a reference, and distribution of the number of examinations for each content of X-ray examination counted in a comparable manner.

4. The medical information processing apparatus according to claim 3, wherein the processing circuitry displays a box-and-whisker plot illustrating the distribution of the number of examinations for each content of X-ray examination serving as a reference, and a box-and-whisker plot illustrating the distribution of the number of examinations for each content of X-ray examination counted side by side.

5. The medical information processing apparatus according to claim 1, wherein the processing circuitry, based on the examination record, counts number of examinations in which a medical exposure dose is equal to or less than a designated upper limit, for each content of X-ray examination used for each of the patients.

6. The medical information processing apparatus according to claim 1, wherein the processing circuitry,
   acquires the examination record that is an examination record of the X-ray examination performed on the patients, and that is serving as a reference;
   based on the acquired examination record, counts the number of examinations for each content of X-ray examination used for each of the patient before a diagnosis is made, for a certain disease; and
   outputs whether there is a significant difference between the counted number of examinations for each content of X-ray examination serving as a reference, and the number of examinations for each content of X-ray examination counted.

7. A medical information processing method comprising:
   acquiring an examination record of an X-ray examination performed on a plurality of patients;
   based on the examination record acquired, counting number of examinations for each content of X-ray examination used for each of the patients before a diagnosis is made, for a certain disease, and
   outputting whether there is a significant difference between number of examinations for each content of X-ray examination serving as a reference, and number of examinations for each content of X-ray examination counted.

* * * * *